(12) United States Patent
Liao (10) Patent No.: US 9,361,841 B2
(45) Date of Patent: Jun. 7, 2016

(54) PIXEL AND DISPLAY DEVICE

(71) Applicant: SHENZHEN CHINA STAR OPTOELECTRONICS TECHNOLOGY CO., LTD, Shenzhen (CN)

(72) Inventor: Zuomin Liao, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 14 days.

(21) Appl. No.: 14/402,107

(22) PCT Filed: Sep. 12, 2014

(86) PCT No.: PCT/CN2014/086406
§ 371 (c)(1),
(2) Date: Nov. 19, 2014

(65) Prior Publication Data
US 2016/0063936 A1 Mar. 3, 2016

(30) Foreign Application Priority Data
Sep. 3, 2014 (CN) .......................... 2014 1 0445715

(51) Int. Cl.
G09G 3/36 (2006.01)
G09G 3/20 (2006.01)
H04N 13/04 (2006.01)

(52) U.S. Cl.
CPC ............ *G09G 3/3648* (2013.01); *G09G 3/2003* (2013.01); *G09G 3/2074* (2013.01); *G09G 3/3674* (2013.01); *G09G 3/3696* (2013.01); *H04N 13/0452* (2013.01); *H04N 13/0454* (2013.01); *G09G 2300/0426* (2013.01); *G09G 2300/0452* (2013.01); *G09G 2310/0202* (2013.01); *G09G 2320/0209* (2013.01); *G09G 2330/021* (2013.01)

(58) Field of Classification Search
None
See application file for complete search history.

(56) References Cited

U.S. PATENT DOCUMENTS

| | | | |
|---|---|---|---|
| 2012/0320173 A1* | 12/2012 | Kim | G02F 1/13363 348/60 |
| 2013/0141481 A1* | 6/2013 | Peng | G02F 1/134309 345/694 |
| 2013/0155056 A1* | 6/2013 | Chen | G09G 5/026 345/419 |

* cited by examiner

*Primary Examiner* — Joseph Haley
(74) *Attorney, Agent, or Firm* — Mark M. Friedman (57) ABSTRACT

A pixel unit and a display device are proposed. The pixel unit includes a primary subpixel, a white subpixel, a display data line, a display scanning line, a common line and a mode scanning line. When the display device is in a 2D display mode, the white subpixel appears bright under the control of the display mode signal. Ehen the display device is in a 3D display mode, the white subpixel appears dark under the control of the display mode signal. Owing to the design of the present invention, power which the convention pixel and display device consumes is obviously reduced. Besides, crosstalk occurring in the conventional display device is successfully solved.

20 Claims, 4 Drawing Sheets

PIXEL AND DISPLAY DEVICE

BACKGROUND OF THE INVENTION

1. Field of the Invention

The present invention relates to the field of display, and more particularly, to a pixel and a display device comprising the pixel.

2. Description of the Prior Art

Figure 1:
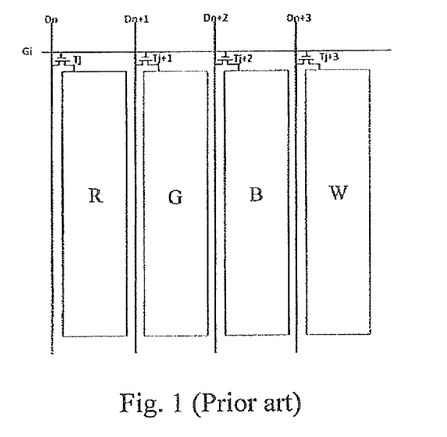
FIG. 1 is a schematic diagram showing the structure of a conventional pixel.

Technology of liquid display improves, and more and more highly-performed liquid crystal displays (LCDs) are produced to satisfy consumers' needs. To reduce overall power consumption of conventional LCDs, LCD designers have developed a new pixel. Please refer to FIG. 1 showing a schematic diagram of a conventional pixel. The conventional pixel comprises a red (R) subpixel, a green (G) subpixel, a blue (B) subpixel, and a white (W) subpixel. A data signal is input to the subpixels through a data line Dn, a data line Dn+1, a data line Dn+2, and a data line Dn+3. A scanning signal is input to the subpixels through a scanning line Di. A thin-film transistor (TFT) Tj, a TFT Tj+1, a TFT Tj+2, and a TFT Tj+3 control each of the subpixels to turn on and turn off. Overall transmittance of the conventional LCDs is improved with the use of the white subpixel. In this way, the power consumption of the conventional LCDs is greatly reduced.

Most conventional LCDs have the function of three-dimensional (3D) display. The light-shielding area in the conventional LCDs capable of showing 3D images is larger for preventing crosstalk. However, there will be a smaller place for disposing the white subpixel. As a result, power which the conventional LCDs consume cannot be well controlled.

Therefore, it is necessary to provide a pixel and a display device for solving the problems occurring in the conventional technology.

SUMMARY OF THE INVENTION

An object of the present invention is to provide a pixel for reducing power consumption and preventing crosstalk and a display device comprising the pixel for solving technical problems occurring in the conventional technology. The technical problems are that a larger amount of power is consumed by the conventional display devices with a power-consuming pixel and crosstalk occurs in the conventional technology.

According to the present invention, a pixel unit disposed in a display device is provided. The pixel unit comprises a primary subpixel; a white subpixel; a first thin-film transistor (TFT), connected to the primary subpixel and the white subpixel; a display data line, for transmitting a data signal to the primary subpixel and the white subpixel through the first TFT; a display scanning line, for transmitting a scanning signal to the first TFT; a second TFT, connected to the white subpixel; a common line, for transmitting a common signal to the white subpixel through the second TFT; and a mode scanning line, for transmitting a display mode signal to the second TFT. When the display device is in a two-dimensional (2D) display mode, the white subpixel appears bright under the control of the display mode signal, and when the display device is in a three-dimensional (3D) display mode, the white subpixel appears dark under the control of the display mode signal.

In one aspect of the present invention, the pixel unit further comprises a display mode converting module for producing the display mode signal. The display mode converting module comprises a first mode converting TFT and a second mode converting TFT. An output terminal of the first mode converting TFT is connected to the mode scanning line, an input terminal of the first mode converting TFT is connected to a pre-stage display scanning line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

In another aspect of the present invention, the first mode converting TFT is forced to conduct under the control of the first controlling switching line when the display device is in the 2D display mode, and the second mode converting TFT is forced to conduct under the control of the second controlling switching line when the display device is in the 3D display mode.

In another aspect of the present invention, the pixel unit further comprises a display mode converting module for producing the display mode signal. The display mode converting module comprises a first mode converting TFT and a second mode converting TFT. Aan output terminal of the first mode converting TFT is connected to the mode scanning line, an input terminal of the first mode converting TFT is connected to a third controlling switching line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the post-stage display scanning line is later than an on-state time of the display scanning line corresponding to the corresponding white subpixel.

In yet another aspect of the present invention, the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

According to the present invention, a pixel unit disposed in a display device is provided. The pixel unit comprises a primary subpixel; a white subpixel; a first thin-film transistor (TFT), connected to the primary subpixel and the white subpixel; a display data line, for transmitting a data signal to the primary subpixel and the white subpixel through the first TFT; a display scanning line, for transmitting a scanning signal to the first TFT; a second TFT, connected to the white subpixel; a common line, for transmitting a common signal to the white subpixel through the second TFT; and a mode scanning line, for transmitting a display mode signal to the second TFT. When the display device is in a two-dimensional (2D) display mode, the white subpixel appears bright under the control of the display mode signal, and when the display device is in a three-dimensional (3D) display mode, the white subpixel appears dark under the control of the display mode signal. The white subpixel shares the same display scanning line with the neighboring primary subpixel and the white subpixel is disposed on one side of the pixel.

In one aspect of the present invention, the pixel unit further comprises a display mode converting module for producing the display mode signal. The display mode converting module comprises a first mode converting TFT and a second mode converting TFT. An output terminal of the first mode converting TFT is connected to the mode scanning line, an input terminal of the first mode converting TFT is connected to a pre-stage display scanning line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

In another aspect of the present invention, the first mode converting TFT is forced to conduct under the control of the first controlling switching line when the display device is in the 2D display mode, and the second mode converting TFT is forced to conduct under the control of the second controlling switching line when the display device is in the 3D display mode.

In another aspect of the present invention, the pixel unit further comprises a display mode converting module for producing the display mode signal. The display mode converting module comprises a first mode converting TFT and a second mode converting TFT. Aan output terminal of the first mode converting TFT is connected to the mode scanning line, an input terminal of the first mode converting TFT is connected to a third controlling switching line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the post-stage display scanning line is later than an on-state time of the display scanning line corresponding to the corresponding white subpixel.

In another aspect of the present invention, the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

In another aspect of the present invention, the white subpixel shares the same display scanning line with the neighboring primary subpixel.

In another aspect of the present invention, the white subpixel and the neighboring primary subpixel use the different display scanning line.

In another aspect of the present invention, the white subpixel is disposed on one side of the pixel.

In yet another aspect of the present invention, the white subpixel is disposed on a middle part of the pixel.

According to the present invention, a display device comprises a backlight source and a pixel unit. The pixel unit comprises a primary subpixel; a white subpixel; a first thin-film transistor (TFT), connected to the primary subpixel and the white subpixel; a display data line, for transmitting a data signal to the primary subpixel and the white subpixel through the first TFT; a display scanning line, for transmitting a scanning signal to the first TFT; a second TFT, connected to the white subpixel; a common line, for transmitting a common signal to the white subpixel through the second TFT; and a mode scanning line, for transmitting a display mode signal to the second TFT. When the display device is in a two-dimensional (2D) display mode, the white subpixel appears bright under the control of the display mode signal, and when the display device is in a three-dimensional (3D) display mode, the white subpixel appears dark under the control of the display mode signal. The white subpixel shares the same display scanning line with the neighboring primary subpixel and the white subpixel is disposed on one side of the pixel.

In one aspect of the present invention, the pixel unit further comprises a display mode converting module for producing the display mode signal. The display mode converting module comprises a first mode converting TFT and a second mode converting TFT. An output terminal of the first mode converting TFT is connected to the mode scanning line, an input terminal of the first mode converting TFT is connected to a pre-stage display scanning line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

In another aspect of the present invention, the first mode converting TFT is forced to conduct under the control of the first controlling switching line when the display device is in the 2D display mode, and the second mode converting TFT is forced to conduct under the control of the second controlling switching line when the display device is in the 3D display mode.

In another aspect of the present invention, the pixel unit further comprises a display mode converting module for producing the display mode signal. The display mode converting module comprises a first mode converting TFT and a second mode converting TFT. Aan output terminal of the first mode converting TFT is connected to the mode scanning line, an input terminal of the first mode converting TFT is connected to a third controlling switching line, and a controlling terminal of the first mode converting TFT is connected to a first controlling switching line. An output terminal of the second mode converting TFT is connected to the mode scanning line, an input terminal of the second mode converting TFT is connected to a post-stage display scanning line, and a controlling terminal of the second mode converting TFT is connected to a second controlling switching line. In the same frame, an on-state time of the post-stage display scanning line is later than an on-state time of the display scanning line corresponding to the corresponding white subpixel.

In another aspect of the present invention, the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

In yet another aspect of the present invention, the white subpixel shares the same display scanning line with the neighboring primary subpixel or the white subpixel and the neighboring primary subpixel use the different display scanning line. The white subpixel is disposed on one side of the pixel or the white subpixel is disposed on a middle part of the pixel.

Compared with the conventional pixels and the convention display devices, the pixel and display device proposed by the present invention has features: Owing to a mode scanning line and a second TFT disposed on the pixel of the display device, a two-dimensional (2D) display mode and a 3D display mode can freely switched. Since the 2D and 3D display modes can freely switched, power which the display devices consumes is reduced and crosstalk is prevented. Because of the design of the present invention, power which the convention pixels and the convention display devices consume is obviously reduced. Besides, crosstalk occurring in the conventional display devices is prevented successfully.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It is noted that the same components are labeled by the same number.

Figure 2:
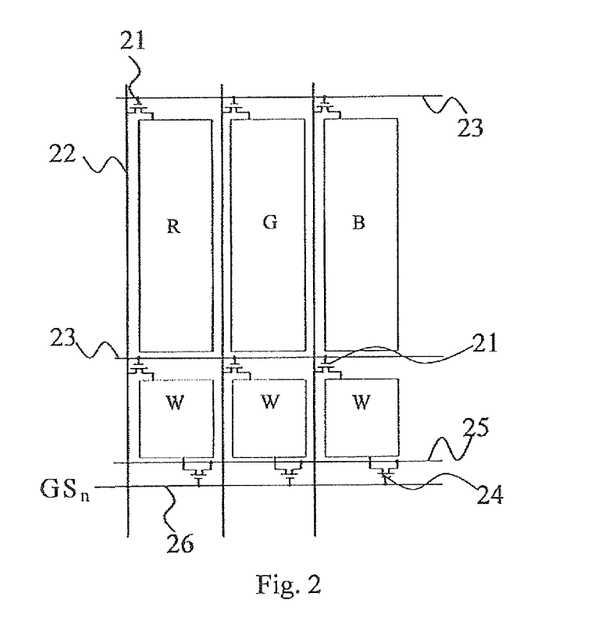
FIG. 2 is a schematic diagram showing the structure of a pixel according to a first preferred embodiment of the present invention.

Please refer to FIG. 2 showing that a schematic diagram showing the structure of a pixel unit 20 according to a first preferred embodiment of the present invention. The pixel unit 20 is arranged in a corresponding display device. The pixel unit 20 comprises three primary subpixels (a red subpixel R, a blue subpixel B, and a green subpixel G) and three white subpixels W. A plurality of primary subpixels and a plurality of white subpixels W can be arranged in the pixel unit 20 according to an individual customer's need. The pixel unit 20 also comprises a first TFT 21, a display data line 22, a display scanning line 23, a second TFT 24, a common line 25, a mode scanning line 26, and a display mode converting module 27. The first TFT 21 is connected to the primary subpixels and the white subpixels W. The first TFT 21 is used for providing a data signal to the primary subpixels and the white subpixels W. The data signal produced by the first TFT 21 is transmitted to the primary subpixels and the white subpixels W through the display data line 22. A scanning signal is transmitted to the first TFT 21 through the display scanning line 23. The first TFT 21 conducts or disconnects under the control of the scanning signal. The second TFT 24 is connected to the white subpixels W for providing a common signal to the white subpixels W. The common signal produced by the second TFT 24 is transmitted to the white subpixels W through the common line 25. A display mode signal GSn is transmitted to the second TFT 24 through the mode scanning line 26. The second TFT 24 conducts or disconnects under the control of the display mode signal GSn. The display mode converting module 27 is used for producing the display mode signal GSn.

The display scanning line 23 comprises a display scanning line used for driving the primary subpixels and a display scanning line used for driving the white subpixels W. To ensure that the data signal is transmitted effectively, the display scanning line in the driven primary subpixels arranged in a pixel and the display scanning line in the driven white subpixels arranged in the same pixel control the conduction of their respective first FTFs 21. When the display scanning line driving the white subpixels W drives the first FTF 21 to conduct, the display scanning line driving the primary subpixels drives the first FTF 21 to disconnect.

Figure 3:
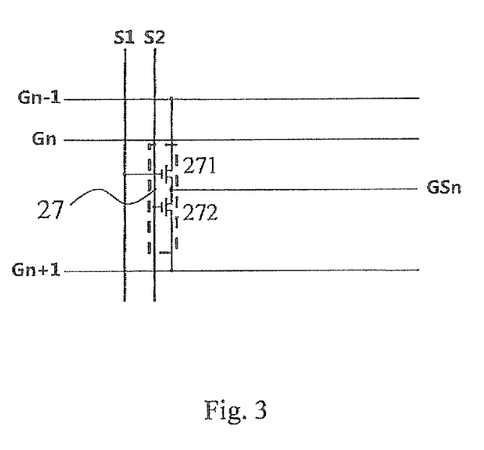
FIG. 3 is a schematic diagram showing the structure of a display mode converting module in a pixel according to a first preferred embodiment of the present invention.

Please refer to FIG. 3 showing a schematic diagram showing the structure of the display mode converting module 27 in the pixel according to the first preferred embodiment of the present invention. The display mode converting module 27 comprises a first mode converting TFT 271 and a second mode converting TFT 272.

An output terminal of the first mode converting TFT 271 is connected to the mode scanning line 26. An input terminal of the first mode converting TFT 271 is connected to a pre-stage display scanning line Gn−1. A controlling terminal of the first mode converting TFT 271 is connected to a first controlling switching line S1. The first controlling switching line S1 controls conduction or disconnection of the first mode converting TFT 271.

An output terminal of the second mode converting TFT 272 is connected to the mode scanning line 26. An input terminal of the second mode converting TFT 272 is connected to a post-stage display scanning line Gn+1. A controlling terminal of the second mode converting TFT 272 is connected to a second controlling switching line S2. The second controlling switching line S2 controls conduction or disconnection of the second mode converting TFT 272.

In the same frame, an on-state time of the pre-stage display scanning line Gn−1 is earlier than an on-state time of the display scanning line Gn corresponding to a corresponding white subpixel W. An on-state time of the post-stage display scanning line Gn+1 is later than an on-state time of the display scanning line Gn to a corresponding white subpixel W.

As FIG. 2 and FIG. 3 show, when the pixel provided by this embodiment is used in the display device in a two-dimensional (2D) mode, the display scanning line 23 transmits the scanning signal to the first TFT 21 in each of the pixels row by row, and the mode scanning line 26 transmits the display mode signal GSn to the second TFT 24 in each of the pixels row by row.

The first mode converting TFT 271 is forced to conduct under the control of the first controlling switching line S1. The second mode converting TFT 272 is forced to disconnect under the control of the second controlling switching line S2. The process is as follows. The display scanning line (i.e., the pre-stage display scanning line Gn−1) in the pixel in the n−1 row turns on. The pixel in the n−1 row inputs the scanning signal through the pre-stage display scanning line Gn−1. The scanning signal (i.e., the display mode signal GSn) in the pre-stage display scanning line Gn−1 is output to the mode scanning line 26 in the n row through the first mode converting TFT 271. The second TFT 24 in the pixel in the n row is forced to conduct under the control of the display mode signal GSn. The common signal produced by the second TFT 24 is transmitted to the white subpixels W through the common line 25. The white subpixels W appear dark.

The display scanning line which the pixel in the n−1 row is disposed on is turned off. Signal of the pre-stage display scanning line Gn−1 is output to the mode scanning signal in the n row through the first mode converting TFT 271. The second TFT 24 in the pixel in the n row is forced to disconnect under the control of the display mode signal GSn. The white subpixels W remain dark.

The display scanning line 23 in the pixel in the n row turns on. The pixel in the n row inputs the data signal through the display data line 22. The data signal produced by the first TFT 21 is transmitted to the white subpixels W through the display data line 22, and the white subpixels W turn bright. Since the second TFT 24 in the pixel in the n row does not conduct anymore, the white subpixels W maintain bright in this frame.

When the display device is in a three-dimensional (3D) display, the scanning signal is transmitted to the first TFT 21 disposed in each of the pixels row by row through the display scanning line 23 arranged in the display device, and the display mode signal GSn is transmitted to the second TFT 24 disposed in each of the pixels row by row through the mode scanning line 26 arranged in the display device.

The first mode converting TFT 271 is forced to disconnect under the control of the first controlling switching line S1. The second mode converting TFT 272 is forced to conduct under the control of the second controlling switching line S2. The process is as follows. The display scanning line 23 in the pixel in the n row turns on. The pixel in the n row inputs the data signal through the display data line 22. The data signal produced by the first TFT 21 is transmitted to the white subpixels W through the display data line 22. At this time, the white subpixels W are bright.

The display scanning line 23 in the pixel in the n row turns off. The data signal stops being transmitted to the white subpixels W through the display data line 22. The second TFT 24 disposed in the pixel in the n row does not conduct. At this time, the white subpixels W maintain bright.

The display scanning line (i.e., the post-stage display scanning line Gn+1) in the pixel in the n+1 row turns on. The pixel in the n+1 row inputs the scanning signal through the post-stage display scanning line Gn+1. The scanning signal (i.e., the display mode signal GSn) in the post-stage display scanning line Gn+1 is output to the mode scanning line 26 in the n row through the second mode converting TFT 272. The second TFT 24 in the pixel in the n row is forced to conduct under the control of the display mode signal GSn. A common signal produced by the second TFT 24 is transmitted to the white subpixels W through the common line 25. The white subpixels W turn dark. No data signals are transmitted to the white subpixels W through the display data line 22 in the following, so the white subpixels W will keep dark in this frame.

The pixel provided by this embodiment is used in the display device in the 2D mode. The white subpixels W in the bright state increase brightness of the image and reduce power consumption. The pixel provided by this embodiment is used in the display device in the 3D mode. The white subpixels W in the dark state prevent crosstalk between neighboring pixels.

Figure 4:
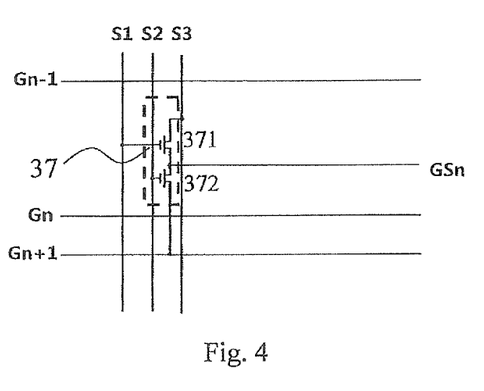
FIG. 4 is a schematic diagram showing the structure of a display mode converting module in a pixel according to a second preferred embodiment of the present invention.

Please refer to FIG. 4 showing a schematic diagram showing the structure of a display mode converting module 37 in a pixel 30 according to a second preferred embodiment of the present invention. Compared with the first preferred embodiment, the structure of the display mode converting module 37 in the pixel 30 in this embodiment is different from the structure of the display mode converting module 27 in the pixel unit 20 in the first preferred embodiment. The display mode converting module 37, like the display mode converting module 27, comprises a first mode converting TFT 371 and a second mode converting TFT 372.

An output terminal of the first mode converting TFT 371 is connected to a mode scanning line 26. An input terminal of the first mode converting TFT 371 is connected to a third controlling switching line S3. A controlling terminal of the first mode converting TFT 371 is connected to a first controlling switching line S1. The first mode converting TFT 371 is forced to conduct or disconnect under the control of the first controlling switching line S1.

An output terminal of the second mode converting TFT 372 is connected to the mode scanning line 26. An input terminal of the second mode converting TFT 372 is connected to a post-stage display scanning line Gn+1. A controlling terminal of the second mode converting TFT 372 is connected to a second controlling switching line S2. The second mode converting TFT 372 is forced to conduct or disconnect under the control of the second controlling switching line S2.

In the same frame, the disconnected signal is transmitted to the second TFT 24 through the third controlling switching line S3 and the mode scanning line 26. Then, the second TFT 24 continues disconnecting. An on-state time of the post-stage display scanning line Gn+1 is later than an on-state time of the display scanning line Gn to a corresponding white subpixel W.

As FIG. 2 and FIG. 4 show, when the pixel provided by this embodiment is used in the display device in a 2D mode, a display scanning line 23 transmits a scanning signal to the first TFT 21 disposed in each of the pixels row by row, and the mode scanning line 26 transmits a display mode signal GSn to the second TFT 24 disposed in each of the pixels row by row.

The first mode converting TFT 371 is forced to conduct under the control of the first controlling switching line S1. The second mode converting TFT 372 is forced to disconnect under the control of the second controlling switching line S2. The process is as follows. The display mode signal GSn is output to the mode scanning line 26 in the n row through the third controlling switching line S3 and the first mode converting TFT 371. The display mode signal GSn is the disconnected signal transmitted through the third controlling switching line S3. The second TFT 24 disposed in the pixel in the n row continues disconnecting under the control of the display mode signal GSn (i.e., the disconnected signal).

The display scanning line 23 in the pixel in the n row turns on. The pixel in the n row inputs a data signal through the display data line 22. The data signal produced by the first TFT 21 is transmitted to the white subpixels W through the display data line 22. The white subpixels W maintain bright.

When the display device is in a 3D display, the scanning signal is transmitted to the first TFT 21 disposed in each of the pixels row by row through the display scanning line 23 arranged in the display device, and the display mode signal GSn is transmitted to the second TFT 24 disposed in each of the pixels row by row through the mode scanning line 26 arranged in the display device.

The first mode converting TFT 371 is forced to disconnect under the control of the first controlling switching line S1. The second mode converting TFT 272 is forced to conduct under the control of the second controlling switching line S2. The process is as follows. The display scanning line 23 in the pixel in the n row turns on. The pixel in the n row inputs the data signal through the display data line 22. The data signal produced by the first TFT 21 is transmitted to the white subpixels W through the display data line 22. At this time, the white subpixels W are bright.

The display scanning line 23 in the pixel in the n row turns off. The data signal stops being transmitted to the white subpixels W through the display data line 22. The second TFT 24 in the pixel in the n row does not conduct. At this time, the white subpixels W maintain bright.

The display scanning line (i.e., the post-stage display scanning line Gn+1) in the pixel in the n+1 row turns on. The pixel in the n+1 row inputs the scanning signal through the post-stage display scanning line Gn+1. The scanning signal (i.e., the display mode signal GSn) in the post-stage display scanning line Gn+1 is output to the mode scanning line 26 in the n row through the second mode converting TFT 372. The second TFT 24 in the pixel in the n row is forced to conduct under the control of the display mode signal GSn. A common signal produced by the second TFT 24 is transmitted to the white subpixels W through a common line 25. The white subpixels W turn dark. No data signals are transmitted to the white subpixels W through the display data line 22 in the following, so the white subpixels W will keep dark in this frame.

When the display mode converting module in this embodiment is in the 2D mode, the first mode converting TFT forces the second TFT to keep disconnected with the disconnected signal on the third controlling switching line. Thus, the white subpixels W in the pixel can be fully charged, and the display effect of 2D images increases greatly.

Figure 5:
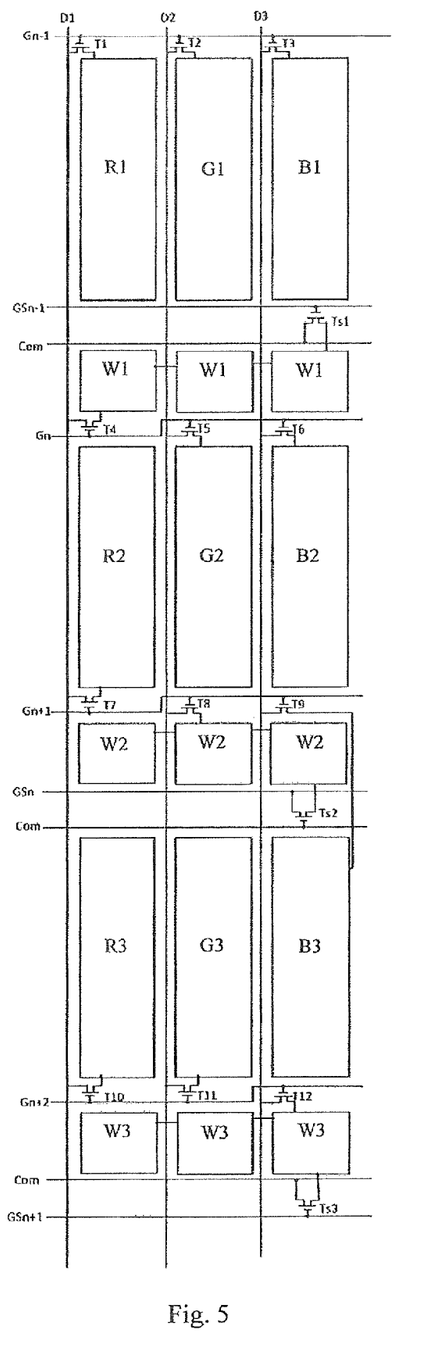
FIG. 5 is a schematic diagram showing the structure of a display mode converting module in a pixel according to a third preferred embodiment of the present invention.

Please refer to FIG. 5 showing a schematic diagram showing the structure of a display mode converting module 27 in a pixel according to a third preferred embodiment of the present invention. A display scanning line drives three subpixels (white subpixels or primary subpixels) at the same time in the same pixel for reducing the use of display scanning lines. The driven subpixels may belong to the same pixel or neighboring pixels. In other words, white subpixels and primary subpixels may and may not share the same display scanning line.

As FIG. 5 shows, a display scanning line Gn−1 drives a red subpixel R1, a green subpixel G1, and a blue subpixel B1. A display scanning line Gn drives a white subpixel W1, a green subpixel G2, and a blue subpixel B2. A display scanning line Gn+1 drives a red subpixel R2, a white subpixel W2, and a blue subpixel B3. A display scanning line Gn+2 drives a red subpixel R3, a green subpixel G3, and a white subpixel W3.

A data signal produced by a first TFT T1 is transmitted to the red subpixel R1 through a display data line D1. The data signal produced by a first TFT T4 is transmitted to the white subpixel W1 through the display data line D1. The data signal produced by a first TFT T7 is transmitted to the red subpixel R2 through the display data line D1. The data signal produced by a first TFT T10 is transmitted to the red subpixel R3 through the display data line D1.

A data signal produced by a first TFT T2 is transmitted to the green subpixel G1 through a display data line D2. The data signal produced by a first TFT T5 is transmitted to the green subpixel G2 through the display data line D2. The data signal produced by a first TFT T8 is transmitted to the white subpixel W2 through the display data line D2. The data signal produced by a first TFT T11 is transmitted to the green subpixel G3 through the display data line D2.

A data signal produced by a first TFT T3 is transmitted to the blue subpixel B1 through a display data line D3. The data signal produced by a first TFT T6 is transmitted to the blue subpixel B2 through the display data line D3. The data signal produced by a first TFT T9 is transmitted to the blue subpixel B3 through the display data line D3. The data signal produced by a first TFT T12 is transmitted to the white subpixel W3 through the display data line D3.

A common signal COM produced by a second TFT TS1 is transmitted to the white subpixel W1 through a mode scanning line GSn−1. The common signal COM produced by a second TFT TS2 is transmitted to the white subpixel W2 through a mode scanning line GSn. The common signal COM produced by a second TFT TS3 is transmitted to the white subpixel W3 through a mode scanning line GSn+1.

In the present embodiment, three rows of pixels show 2D or 3D images are controlled by four display scanning lines and three display data lines. Compared with the first preferred embodiment where six display scanning lines and three display data lines control are used, the advantage of the present embodiment is to use much less display scanning lines.

The present embodiment is based on the first preferred embodiment and improves. This embodiment uses less display scanning lines. In this way, it spends less money in producing a display device with pixels.

Figure 6:
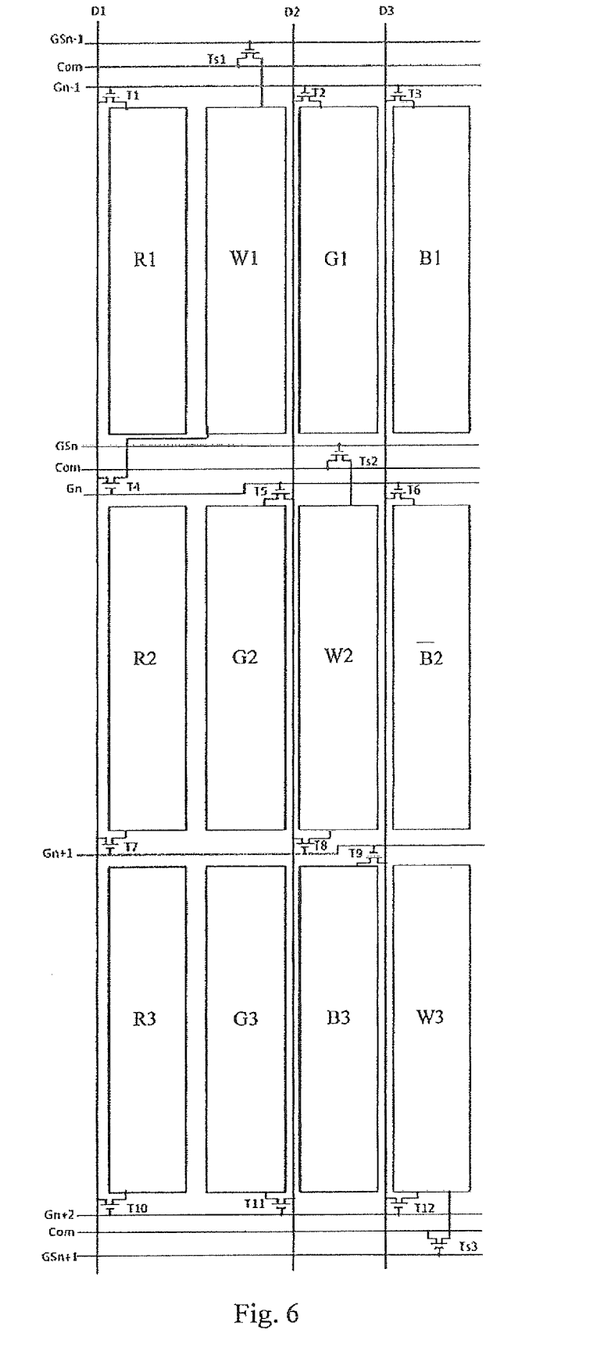
FIG. 6 is a schematic diagram showing the structure of a pixel according to a fourth preferred embodiment of the present invention.

Please refer to FIG. 6 showing a schematic diagram showing the structure of a display mode converting module 27 in a pixel according to a fourth preferred embodiment of the present invention. A display scanning line drives three subpixels (white subpixels or primary subpixels) at the same time in the same pixel for reducing the use of display scanning lines in the present embodiment. The driven subpixels may belong to the same pixel or neighboring pixels. The white subpixels are disposed on one side or on a middle part of the pixel. The white subpixels may or may not share the same display scanning line with the neighboring primary subpixels.

As FIG. 6 shows, a display scanning line Gn−1 drives a red subpixel R1, a green subpixel G1, and a blue subpixel B1. A display scanning line Gn drives a white subpixel W1, a green subpixel G2, and a blue subpixel B2. A display scanning line Gn+1 drives a red subpixel R2, a white subpixel W2, and a blue subpixel B3. A display scanning line Gn+2 drives a red subpixel R3, a green subpixel G3, and a white subpixel W3.

A data signal produced by a first TFT T1 is transmitted to the red subpixel R1 through a display data line D1. The data signal produced by a first TFT T4 is transmitted to the white subpixel W1 through the display data line D1. The data signal produced by a first TFT T7 is transmitted to the red subpixel R2 through the display data line D1. The data signal produced by a first TFT T10 is transmitted to the red subpixel R3 through the display data line D1.

A data signal produced by a first TFT T2 is transmitted to the green subpixel G1 through a display data line D2. The data signal produced by a first TFT T5 is transmitted to the green subpixel G2 through the display data line D2. The data signal produced by a first TFT T8 is transmitted to the white subpixel W2 through the display data line D2. The data signal produced by a first TFT T11 is transmitted to the green subpixel G3 through the display data line D2.

A data signal produced by a first TFT T3 is transmitted to the blue subpixel B1 through a display data line D3. The data signal produced by a first TFT T6 is transmitted to the blue subpixel B2 through the display data line D3. The data signal produced by a first TFT T9 is transmitted to the blue subpixel B3 through the display data line D3. The data signal produced by a first TFT T12 is transmitted to the white subpixel W3 through the display data line D3.

A common signal COM produced by a second TFT TS1 is transmitted to the white subpixel W1 through a mode scanning line GSn−1. The common signal COM produced by a second TFT TS2 is transmitted to the white subpixel W2 through a mode scanning line GSn. The common signal COM produced by a second TFT TS3 is transmitted to the white subpixel W3 through a mode scanning line GSn+1.

In the present embodiment, three rows of pixels show 2D or 3D images are controlled by four display scanning lines and three display data lines. Compared with the first preferred embodiment where six display scanning lines and three display data lines control are used, the advantage of the present embodiment is to use much less display scanning lines.

The present embodiment is based on the first preferred embodiment and improves. This embodiment uses less display scanning lines. In this way, it spends less money in producing a display device for pixels.

A display device comprising the above-mentioned pixel is also proposed by the present invention. The display device comprises a display panel comprising the above-mentioned pixel and a backlight source. The working principle of the display device and the way to use the display device can refer to the description of the pixel in the preferred embodiments. It is very similar.

Owing to the mode scanning lines and the second TFT disposed on the pixel of the display device, the 2D display mode and the 3D display mode can freely switched. Since the 2D and 3D display modes can freely switched, power which the display device consumes is reduced and crosstalk is prevented. Owing to the design of the present invention, power which the convention pixel and display device consumes is obviously reduced. Besides, crosstalk occurring in the conventional display device is successfully solved.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A pixel unit, disposed in a display device, comprising:
   a primary subpixel;
   a white subpixel;
   a first thin-film transistor (TFT), connected to the primary subpixel and the white subpixel;
   a display data line, for transmitting a data signal to the primary subpixel and the white subpixel through the first TFT;
   a display scanning line, for transmitting a scanning signal to the first TFT;
   a second TFT, connected to the white subpixel;
   a common line, for transmitting a common signal to the white subpixel through the second TFT; and
   a mode scanning line, for transmitting a display mode signal to the second TFT;
   wherein when the display device is in a two-dimensional (2D) display mode, the white subpixel appears bright under the control of the display mode signal, and when the display device is in a three-dimensional (3D) display mode, the white subpixel appears dark under the control of the display mode signal,
   wherein the white subpixel shares the same display scanning line with the neighboring primary subpixel and the white subpixel is disposed on one side of the pixel.

2. The pixel unit as claimed in claim 1 further comprising a display mode converting module for producing the display mode signal,
   wherein the display mode converting module comprises a first mode converting TFT and a second mode converting TFT;
   an output terminal of the first mode converting TFT is connected to the mode scanning line, an input terminal of the first mode converting TFT is connected to a pre-stage display scanning line, and a controlling terminal of the first mode converting TFT is connected to a first controlling switching line;
   an output terminal of the second mode converting TFT is connected to the mode scanning line, an input terminal of the second mode converting TFT is connected to a post-stage display scanning line, and a controlling terminal of the second mode converting TFT is connected to a second controlling switching line;
   wherein in the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

3. The pixel unit as claimed in claim 2, wherein the first mode converting TFT is forced to conduct under the control of the first controlling switching line when the display device is in the 2D display mode, and the second mode converting TFT is forced to conduct under the control of the second controlling switching line when the display device is in the 3D display mode.

4. The pixel unit as claimed in claim 1 further comprising a display mode converting module for producing the display mode signal;
   wherein the display mode converting module comprises a first mode converting TFT and a second mode converting TFT;
   an output terminal of the first mode converting TFT is connected to the mode scanning line, an input terminal of the first mode converting TFT is connected to a third controlling switching line, and a controlling terminal of the first mode converting TFT is connected to a first controlling switching line;
   an output terminal of the second mode converting TFT is connected to the mode scanning line, an input terminal of the second mode converting TFT is connected to a post-stage display scanning line, and a controlling terminal of the second mode converting TFT is connected to a second controlling switching line;
   wherein in the same frame, an on-state time of the post-stage display scanning line is later than an on-state time of the display scanning line corresponding to the corresponding white subpixel.

5. The pixel unit as claimed in claim 4, wherein the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

6. A pixel unit, disposed in a display device, comprising:
a primary subpixel;
a white subpixel;
a first thin-film transistor (TFT), connected to the primary subpixel and the white subpixel;
a display data line, for transmitting a data signal to the primary subpixel and the white subpixel through the first TFT;
a display scanning line, for transmitting a scanning signal to the first TFT;
a second TFT, connected to the white subpixel;
a common line, for transmitting a common signal to the white subpixel through the second TFT; and
a mode scanning line, for transmitting a display mode signal to the second TFT;
wherein when the display device is in a two-dimensional (2D) display mode, the white subpixel appears bright under the control of the display mode signal, and when the display device is in a three-dimensional (3D) display mode, the white subpixel appears dark under the control of the display mode signal.

7. The pixel unit as claimed in claim 6 further comprising a display mode converting module for producing the display mode signal,
wherein the display mode converting module comprises a first mode converting TFT and a second mode converting TFT;
an output terminal of the first mode converting TFT is connected to the mode scanning line, an input terminal of the first mode converting TFT is connected to a pre-stage display scanning line, and a controlling terminal of the first mode converting TFT is connected to a first controlling switching line;
an output terminal of the second mode converting TFT is connected to the mode scanning line, an input terminal of the second mode converting TFT is connected to a post-stage display scanning line, and a controlling terminal of the second mode converting TFT is connected to a second controlling switching line;
wherein in the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

8. The pixel unit as claimed in claim 7, wherein the first mode converting TFT is forced to conduct under the control of the first controlling switching line when the display device is in the 2D display mode, and the second mode converting TFT is forced to conduct under the control of the second controlling switching line when the display device is in the 3D display mode.

9. The pixel unit as claimed in claim 6 further comprising a display mode converting module for producing the display mode signal;
wherein the display mode converting module comprises a first mode converting TFT and a second mode converting TFT;
an output terminal of the first mode converting TFT is connected to the mode scanning line, an input terminal of the first mode converting TFT is connected to a third controlling switching line, and a controlling terminal of the first mode converting TFT is connected to a first controlling switching line;
an output terminal of the second mode converting TFT is connected to the mode scanning line, an input terminal of the second mode converting TFT is connected to a post-stage display scanning line, and a controlling terminal of the second mode converting TFT is connected to a second controlling switching line;
wherein in the same frame, an on-state time of the post-stage display scanning line is later than an on-state time of the display scanning line corresponding to the corresponding white subpixel.

10. The pixel unit as claimed in claim 9, wherein the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

11. The pixel unit as claimed in claim 6, wherein the white subpixel shares the same display scanning line with the neighboring primary subpixel.

12. The pixel unit as claimed in claim 6, wherein the white subpixel and the neighboring primary subpixel use the different display scanning line.

13. The pixel unit as claimed in claim 6, wherein the white subpixel is disposed on one side of the pixel.

14. The pixel unit as claimed in claim 6, wherein the white subpixel is disposed on a middle part of the pixel.

15. A display device, comprising:
a backlight source; and
a pixel unit, comprising:
a primary subpixel;
a white subpixel;
a first thin-film transistor (TFT), connected to the primary subpixel and the white subpixel;
a display data line, for transmitting a data signal to the primary subpixel and the white subpixel through the first TFT;
a display scanning line, for transmitting a scanning signal to the first TFT;
a second TFT, connected to the white subpixel;
a common line, for transmitting a common signal to the white subpixel through the second TFT; and
a mode scanning line, for transmitting a display mode signal to the second TFT;
wherein when the display device is in a two-dimensional (2D) display mode, the white subpixel appears bright under the control of the display mode signal, and when the display device is in a three-dimensional (3D) display mode, the white subpixel appears dark under the control of the display mode signal.

16. The display device as claimed in claim 15, wherein the pixel unit further comprises a display mode converting module for producing the display mode signal, the display mode converting module comprises a first mode converting TFT and a second mode converting TFT;

an output terminal of the first mode converting TFT is connected to the mode scanning line, an input terminal of the first mode converting TFT is connected to a pre-stage display scanning line, and a controlling terminal of the first mode converting TFT is connected to a first controlling switching line;

an output terminal of the second mode converting TFT is connected to the mode scanning line, an input terminal of the second mode converting TFT is connected to a post-stage display scanning line, and a controlling terminal of the second mode converting TFT is connected to a second controlling switching line;

wherein in the same frame, an on-state time of the pre-stage display scanning line is earlier than an on-state time of the display scanning line corresponding to the corresponding white subpixel, and an on-state time of the post-stage display scanning line is later than the on-state time of the display scanning line corresponding to the corresponding white subpixel.

17. The display device as claimed in claim 16, wherein the first mode converting TFT is forced to conduct under the control of the first controlling switching line when the display device is in the 2D display mode, and the second mode converting TFT is forced to conduct under the control of the second controlling switching line when the display device is in the 3D display mode.

18. The display device as claimed in claim 15 wherein the pixel unit further comprises a display mode converting module for producing the display mode signal, the display mode converting module comprises a first mode converting TFT and a second mode converting TFT;

an output terminal of the first mode converting TFT is connected to the mode scanning line, an input terminal of the first mode converting TFT is connected to a third controlling switching line, and a controlling terminal of the first mode converting TFT is connected to a first controlling switching line;

an output terminal of the second mode converting TFT is connected to the mode scanning line, an input terminal of the second mode converting TFT is connected to a post-stage display scanning line, and a controlling terminal of the second mode converting TFT is connected to a second controlling switching line;

wherein in the same frame, an on-state time of the post-stage display scanning line is later than an on-state time of the display scanning line corresponding to the corresponding white subpixel.

19. The display device as claimed in claim 18, wherein the first mode converting TFT is forced to conduct under the control of the first controlling switching line when the display device is in the 2D display mode, the second mode converting TFT is forced to conduct under the control of the second controlling switching line when the display device is in the 3D display mode, and a disconnected signal is transmitted to the second TFT through the third controlling switching line and the mode scanning line for keeping the second TFT disconnecting.

20. The display device as claimed in claim 15, wherein the white subpixel shares the same display scanning line with the neighboring primary subpixel or the white subpixel and the neighboring primary subpixel use the different display scanning line, wherein the white subpixel is disposed on one side of the pixel or the white subpixel is disposed on a middle part of the pixel.

* * * * *